Figure 1:
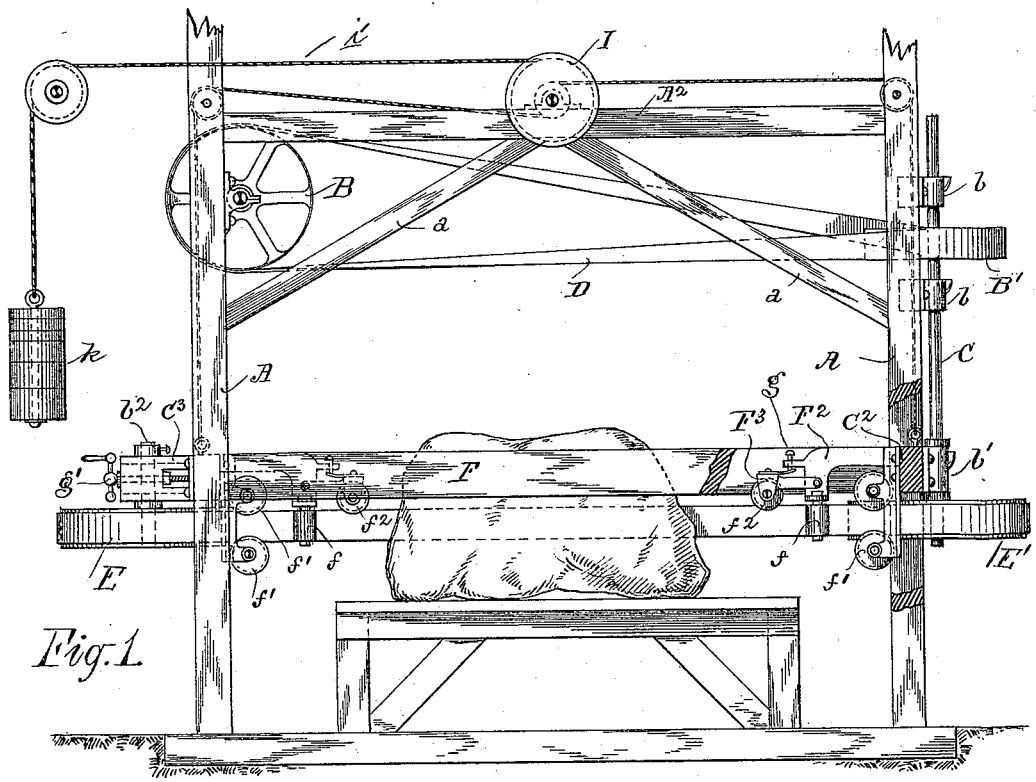

(No Model.)   2 Sheets—Sheet 1.

F. H. KESSELER.
STONE SAW MILL.

No. 451,199. Patented Apr. 28, 1891.

Witnesses.   Inventor (No Model.) 2 Sheets—Sheet 2.

F. H. KESSELER.
STONE SAW MILL.

No. 451,199. Patented Apr. 28, 1891.

Witnesses.

Inventor
Francis H. Kesseler

UNITED STATES PATENT OFFICE.

FRANCIS H. KESSELER, OF SAN FRANCISCO, CALIFORNIA.

STONE SAW MILL.

SPECIFICATION forming part of Letters Patent No. 451,199, dated April 28, 1891.

Application filed May 21, 1890. Serial No. 352,670. (No model.)

*To all whom it may concern:*

Be it known that I, FRANCIS H. KESSELER, a citizen of the United States, residing at the city and county of San Francisco, and State of California, have invented certain new and useful Improvements in Stone Saw Mills; and I do hereby declare the following to be a full, clear, and exact description of said invention, such as will enable others skilled in the art to which it most nearly appertains to make, use, and practice the same.

This invention relates to certain new and useful improvements in saw-mills for stone; and it consists of the parts and details of construction, as will be hereinafter more fully shown in the drawings, described and pointed out in the specification.

My invention relates more particularly in providing a machine for the sawing of onyx; and it consists in a mill having an inner movable frame adapted to lower automatically with the cut of the stone, and in providing an endless saw, so as to permit of action upon one or more blocks of stone at the same time.

My invention further consists in suitable guides for the run of the saw and means for the regulation of the tension thereof.

Figure 2:
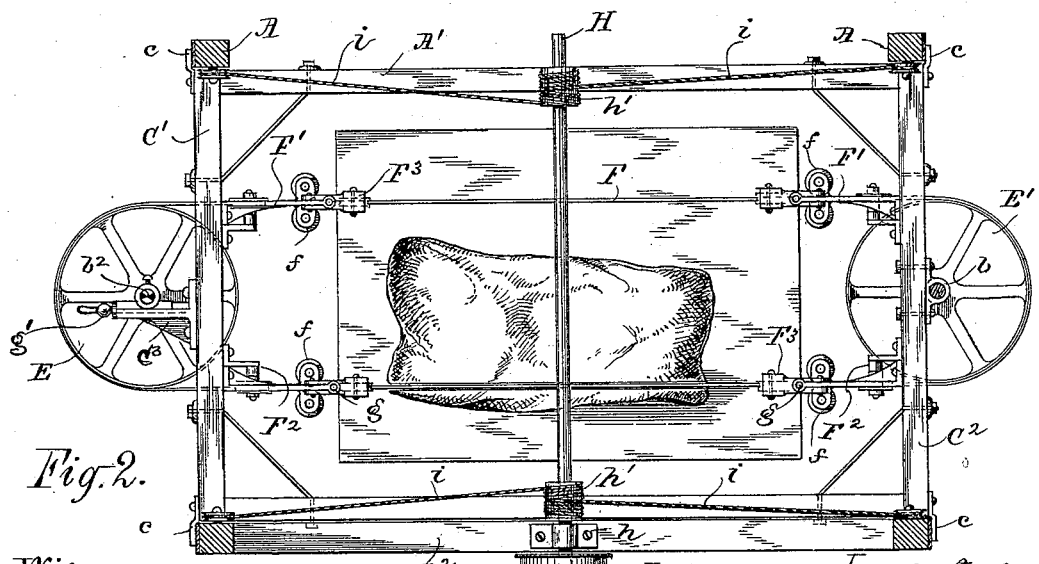
Figure 3:
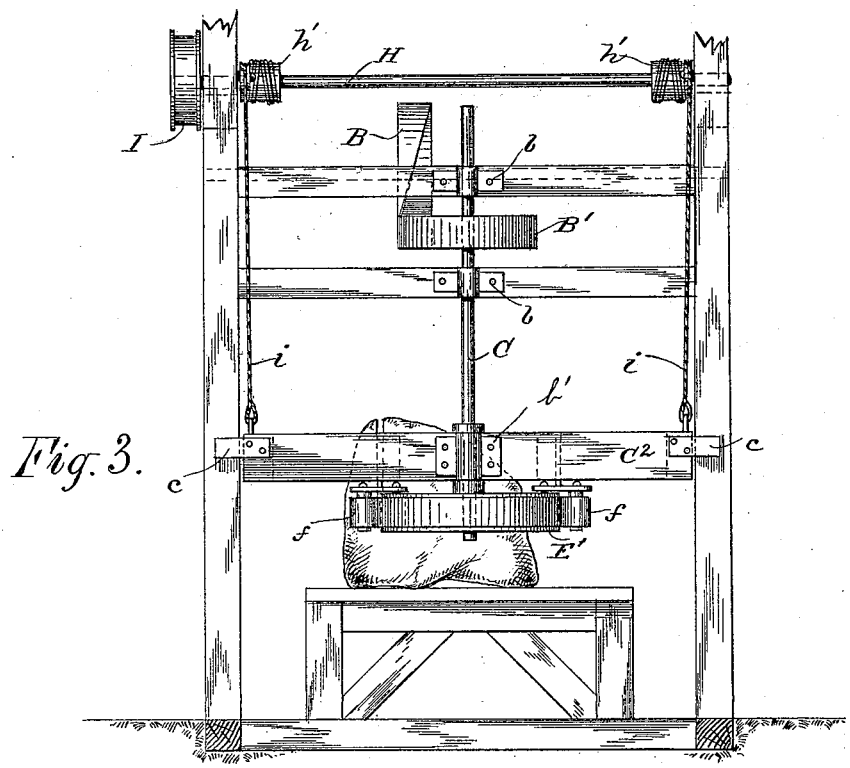
Figure 4:
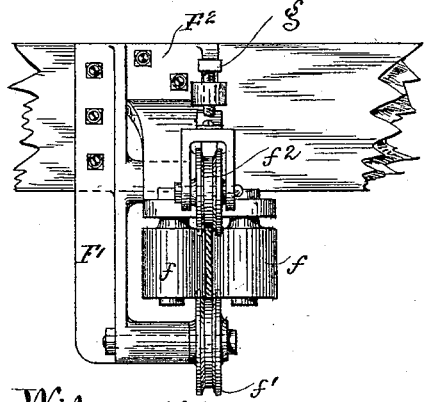
Figure 5:
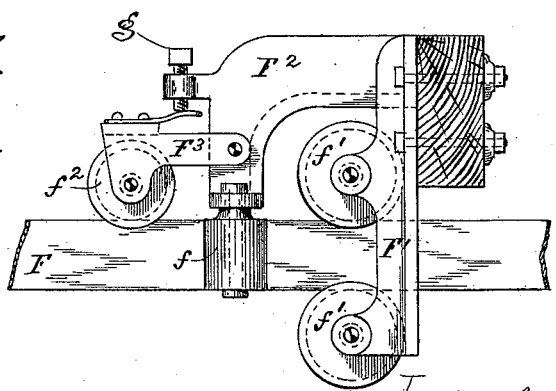

Referring to the drawings forming a part of this specification, in which similar letters of reference are used to denote corresponding parts throughout the entire specification and several views of the drawings, Figure 1 is a side view in elevation; Fig. 2, a top plan view; Fig. 3, an end view; Fig. 4, a broken detail view showing the guide-rollers, and Fig. 5 a similar view in side elevation.

The outer frame of the mill is composed of the uprights A and cross and longitudinal beams $A'A^2$. For strengthening purpose I provide the braces $a$, which, if so desired, may be dispensed with. Within said frame I locate the drive-wheels B B', the latter one of which I secure upon the vertical shaft or rod C, which works within the bearings or hangers $b$, secured thereto, and hanger or bearing $b'$, bolted to the sliding beam $C^2$. Said wheels are connected by means of the belt D, which passes thereover, and which is operated by any suitable machinery. (Not shown.) Between the uprights A work the sliding cross-beams $C'$ $C^2$, which are provided at their ends with the guide and guard strip $c$.

The letters E E' represent the saw-rolls, one of which works upon the axle or shaft C, secured within the bearing $b'$, while the other revolves upon the short axle or shaft $b^2$, located upon the hanger $C^3$ at the opposite end of the mill, extending from the cross-beam $C^2$. Around these rolls works the endless traveling saw F. To the inner face of the sliding cross-beams $C' C^2$, I attach the forwardly and downwardly extending arms $F' F^2$, which carry the guide-rollers $f f'$, the guide-rollers $f$ situated so as to act upon the side of the saw, while rollers $f'$ act upon the top and bottom, as clearly shown. The saw as it revolves passes between these guides, and is thus prevented from binding within the stone. However, in order to provide against an inclined cut of the stone, I have provided the hangers or arms $F^3$ with the supplemental guide $f^2$, which is movably secured thereto, and which is operated by means of the screw or pin $g$, so as to bear upon the top of the saw. Thus I am enabled to depress the saw during its working, if so desired.

To the forwardly-extending hanger or arm $C^3$, I secure the adjusting or tightening screw $g'$ for the tension of the saw. Upon the longitudinal beams $A^2$ is secured within bearing $h$ the axle H, which is provided with the drums $h'$, to which is fastened one end of the chains $i$. The other end of said chains $i$ is attached to the sliding beams $C' C^2$. Upon the outer end of said axle is provided the winding-drum I, to which the chain $i$ is fastened. To the other end of this chain is secured the weight $k$. This weight is nearly equal to that of the entire inner frame, which permits of the latter being easily raised for the purpose of inserting a block of stone under the saw with the least amount of exertion. Thus it is obvious that as the saw cuts into the stone the entire frame moves down therewith.

By providing an endless saw to the mill I am enabled to operate upon one or more blocks at the same time.

Having thus described my invention, what I claim as new, and desire to secure protection in by Letters Patent of the United States, is—

1. In a saw-mill for stone, the combination of a frame, vertically-movable cross-pieces working between the uprights thereof, saw-rollers, an endless band-saw, forwardly-extending hangers, guide-rollers journaled in said hangers and adapted to act upon the sides of the saw, arms extending from said forwardly-extending hangers and carrying a roller bearing upon the top of the saw, and a screw or pin for adjusting the same, substantially as set forth.

2. The combination, with the herein-described stone saw mill, of the endless traveling saw, guide-rollers secured to the movable end beams, adapted to maintain the same in line, and of the adjustable top guide-roller for maintaining the saw in a horizontal position for regulating the cut of the saw, substantially as set forth and described.

In testimony whereof I have hereunto affixed my signature in the presence of witnesses.

FRANCIS H. KESSELER.

In presence of—
N. A. ACKER,
M. G. LOEFLER.